United States Patent [19]

Gasman et al.

[11] 4,195,011

[45] Mar. 25, 1980

[54] INJECTION MOLDING COMPOSITIONS

[75] Inventors: Robert C. Gasman, West Milford; John J. Charles, Bloomingdale, both of N.J.

[73] Assignee: GAF Corporation, New York, N.Y.

[21] Appl. No.: 814,548

[22] Filed: Jul. 11, 1977

[51] Int. Cl.$^2$ .............................................. C08K 3/36
[52] U.S. Cl. .................................. 260/40 R; 525/228
[58] Field of Search ....................... 260/860, 40 R, 873

[56] References Cited

U.S. PATENT DOCUMENTS

| | | | |
|---|---|---|---|
| 3,740,371 | 6/1973 | Segal | 260/40 R |
| 3,745,140 | 7/1973 | Segal | 260/40 R |
| 4,011,285 | 3/1977 | Seymour et al. | 260/40 R X |
| 4,013,613 | 3/1977 | Abolins | 260/40 R |
| 4,018,738 | 4/1977 | Rawlings | 260/40 R |
| 4,064,098 | 12/1977 | Saitoh et al. | 260/40 R |

OTHER PUBLICATIONS

W. T. Collins & J. L. Kludt, "New Silane Coupling Agents for Sphere and Mineral Reinforced Engineering Thermoplastics," 30th Ann. Tech. Conf. (1975), Reinforced Plastics/Composites Institute, S.P.I., Inc.

*Primary Examiner*—Sandra M. Person
*Attorney, Agent, or Firm*—Joshua J. Ward; Walter C. Kehm

[57] ABSTRACT

Molding composition and molded products comprising polybutylene terephthalate containing thermally stable reinforcing fibers, such as glass fibers, having an aspect ratio of at least about 5, and between about 5 and about 70 wt. % based on total PBT composition of novaculite having an average particle size between about 3 and about 5 microns. In preferred embodiments the composition also includes amorphous thermally stable resins such as polymethyl methacrylate and poly(butylene terephthalate-co-tetramethylene oxide).

20 Claims, No Drawings

INJECTION MOLDING COMPOSITIONS

BACKGROUND OF THE INVENTION

Polybutylene terephthalate (PBT) reinforced with thermally stable reinforcing fibers such as glass fibers is well known as a molding resin and is described in numerous patents and publications including for instance U.S. Pat. Nos. 3,814,725, 3,814,786 and 3,624,024. Fiber reinforcement generally improves the tensile strength, flexural strength, flexural modulus and heat deflection temperature of the molding composition. However, moldings, especially injection moldings of large fiber reinforced articles of PBT, tend to display distortion or warping while some other resins of otherwise less desireable properties do not present such problems. It is believed that strains resulting from the different rates at which resin and glass contract during the cooling of molded particles are responsible for such warping. The warping is thus believed due to the presence of the very reinforcing fibers which contribute to the enhanced physical characteristics of the finished product.

SUMMARY OF THE INVENTION

It is accordingly an object of the invention to provide an improved PBT molding composition and method for producing same as well as molded articles of such composition. As compared with known prior art compositions, the molded compositions of the invention have substantially less distortion due to warping while at the same time retaining substantially all of the improved physical properties imparted by reinforcing fibers.

Molding compositions of the invention comprise at least about 30 wt% PBT having an intrinsic viscosity (I.V.) between about 0.5 and about 2.0 deciliters per gram (dl/g) and contain:
  (a) between about 0.5 and about 50 wt% based on total weight of molding composition of thermally stable reinforcing fibers having diameters between about 5 and about 20 microns and aspect ratios of at least about 5, and
  (b) between about 5 and about 70 wt% based on total molding composition of novaculite having an average particle size between about 3 and about 5 microns, with at least 90% of such novaculite particles having a maximum particle size less than about 10 microns.

In a preferred embodiment the molding resin of the invention also contains between about 1 and about 25 wt% based on total weight of PBT molding composition of an amorphous thermally stable resin such as polymethyl methacrylate and between 5 and 40 percent of a partially crystalline resin such as poly(butylene terephthalate-co-tetramethylene oxide). A further preferred embodiment involves the use of glass fibers as the reinforcing fibers. The invention also contemplates a method for producing molding resin of the invention by intimately blending the above mentioned ingredients of such resin and also contemplates molded products made from molding compositions of the invention.

DETAILED DESCRIPTION OF THE INVENTION

As mentioned above, the invention includes a novel molding composition, molded articles of such composition and method for producing such composition. The molding composition broadly comprises between about 30 and about 80 wt% PBT having an intrinsic viscosity between about 0.5 and about 2.0 dl/g and containing thermally stable reinforcing fibers, and novaculite.

Polybutylene terephthalate (PBT) used in the invention may be produced in any suitable manner such as by reacting terephthalic acid or dialkyl ester of terephthalaic acid, e.g., dimethyl terephthalate, with diols having four carbon atoms, e.g., tetramethylene glycol. PBT for use in the invention has an intrinsic viscosity (I.V.) between about 0.5 and about 2.0 dl/g measured in orthochlorophenol at 25° C. Manufacture of PBT is well known to those skilled in the art as are the techniques for obtaining PBT of desired intrinsic viscosity. Such conventional production techniques for PBT are discussed in greater detail for instance is U.S. Pat. No. 2,465,319.

Thermally stable reinforcing fibers used in the invention may be any such fibers which are thermally stable at the conditions normally used in the producing of products from PBT molding compositions and include for instance fibers of materials such as glass, asbestos, carbon, fibrous potassium titantate, iron whiskers, etc. Such fibers should normally have diameters between about 5 and about 20 microns and aspect ratios (ratio of length of fiber to diameter of fiber) of at least about 5. Glass fibers are preferred for use in the invention. Glass fibers, where used, preferably have diameters between about 10 and about 15 microns and aspect ratios of at least about 20.

Reinforcing fibers used in the invention are normally used in amounts between about 0.5 and 50 wt% based on total weight of PBT composite, more preferably in amounts between about 1 and about 20 wt% on the same basis. As is commonly recognized, the use of such fibers increases substantially such physical properties as tensile strength, flexural strength, flexural modulus and heat distortion temperature of the PBT. Glass or other fibers for use in the invention may be manufactured and incorporated into the PBT in any suitable manner, such as by separate extrusion compounding with the PBT, extrusion compounding with other ingredients of the compositions of the invention incorporating into the PBT or PBT containing composition during injection molding of products from the PBT.

As mentioned above, products molded from fiber reinforced PBT, while having substantially improved physical properties in certain respects, suffer from excessive warpage believed to be due to the presence of the fibers. It is thus necessary in accordance with the present invention to incorporate novaculite in the compositions and the products of the invention for the purpose of reducing the adverse effect of the reinforcing fibers on warpage. The addition of novaculite to the molding compositions serves to minimize loss of impact strength and elongation characteristics of molded products without substantial harm to warpage or other desired characteristics, and serves to control shrinkage of molded PBT products in general as well as alleviating the warpage problem normally experienced with fiber reinforced PBT. Novaculite has been previously suggested as a filler for PBT but its advantages in combination with the other ingredients of the molding compositions of the invention have not been recognized.

In addition to the above mentioned essential ingredients of the composition and products of the invention, the use of an additional ingredient, i.e., an amorphous, thermally stable resin in amounts between about 1 and about 25 wt% based on total weight of PBT molding composition is preferred. Suitable resins for this purpose include generally any amorphous resin which is thermally stable under the conditions used in forming molded products from PBT and may include such diverse materials as polymethyl methacrylate, poly(butyl methacrylate-co-methyl methacrylate), poly(ethyl acrylate-co-methyl methacrylate), poly ethylene vinyl acetate, poly carbonate, and polysulfone, etc. An especially preferred amorphous resin for use in the invention is polymethyl methacrylate, generally available under the trade name of Lucite or Plexiglas. Amorphous resin used in the invention, especially the preferred polymethyl methacrylate, is resin having a melt index between about 1 and about 25. In addition to the amorphous resin, it is often advantageous to use a partially crystalline resin such as poly(butylene terephthalate-co-tetramethylene oxide), in amounts of 5 to 30% by weight of total molding composition. In addition to the ingredients mentioned above, compositions and products of the invention may contain suitable flame retardant additives in amounts up to about 30 wt% based on total weight of PBT composite and may contain relatively minor amounts of other materials which do not unduly effect the desired characteristics of the finished products. Such additional materials, may, depending upon the particular compositions employed and products desired, include for instance, colorants and lubricants. Where present, such additional materials other than flame retardants normally comprise no more than about 5 wt% of the total composition or finished product.

In preparing molded compositions of the invention, the reinforcing fibers may be intimately blended into the PBT by any suitable means such as by dry blending or melt blending, blending in extruders, heated rolls or other types of mixers, etc. Conventional master batching techniques may also be used. The same considerations apply to addition of the other essential or optional ingredients of the invention, including specifically the novaculite, the poly(butylene terephthalate-co-tetramethylene oxide) and the amorphous, thermally stable resin. Suitable blending and molding techniques are well known in the art and need not be described in detail herein.

In a preferred embodiment of the invention, the composition of the invention is compounded by dry blending followed by melt mixing in an extruder with barrel temperatures between about 240 and about 270° C. Likewise, in molding products of the invention from the molding composition of the invention, injection molding is preferred. When injection molding is used, barrel temperatures between about 450° and 500° F. are preferred. In a preferred embodiment, the molding composition of the invention is formed by extrusion and pelletized. Products of the invention are then produced by injection molding of pelletized extrudate.

As mentioned above, one of the major advantages of the compositions and products of the invention is that shrinkage and warpage normally associated with the use of reinforcing fibers is reduced without substantial harm to the desirable improvements in physical properties associated with use of such fibers. While warpage is frequently determined by visual inspection, a quantitative definition can be expressed in terms of percent warp equals $$\frac{(dm - t) \times 100}{t}$$

where "dm" equals maximum distance from a flat surface to a point on a warped side of the article being evaluated, and "t" equals the thickness of the warped side of the article. This equation defines warp in terms of wall thickness without regard to length of the part. Since some absolute deviation from a straight line gives the same percent warp, a correction for part length must also be included to more accurately define warpage of a part in terms of the visual effect of the warp. Part wrap (PW) may therefore be defined as $$PW = \frac{\% \text{ warp}}{L} = \frac{(dm - t) \times 100}{t \times L}$$

wherein PW equals part warp, "L" equals total length of the warp member and the other values are as stated immediately above. In evaluating warpage of samples and products, an average warpage value for a five sided plain box is frequently calculated based upon measurements of warpage of the right, left, front and back sides of the box.

The following example is intended to illustrate the application and usefulness of the invention without limiting the scope thereof. In the example, all quantities are given in terms of weight percent based on total composition unless otherwise specified. Physical properties, including warpage, were measured by the following criteria and reported as an average of samples of each composition tested:

| Property | Test Procedures |
|---|---|
| Notched Izod Impact | ASTM D-256 |
| Unnotched Izod Impact | ASTM D-256 |
| Percent warp | As Defined Above |
| Heat Distortion | ASTM D-748 |

EXAMPLE

In order to evaluate certain physical properties, including warpage, of molded articles made from molding compositions of the invention, compositions having the ingredients listed in Table I below were prepared using PBT having an intrinsic viscosity of 0.8. The compositions were compounded on a Midland Ross 1.5 inch extruder using the following conditions:

| Temperature | 240°–255° C. |
|---|---|
| Pressure | 0–200 psi |
| Amperage | 10–12 |
| Screw RPM | 75 |

The pelletized filled extrudate was molded on a 50 ton, 3 oz. reciprocating screw injection molding machine to provide ASTM test specimens. Parts suitable for measuring warpage (camera slide box with four large, flat sides) were molded on a 350 ton, 36 oz. Impco screw ram machine. Molding conditions were:

| 3 oz., 50 Ton Machine | |
|---|---|
| Barrel Temperature | 480° F. |
| Injection Pressure | 900–1100 psi |
| Screw RPM | 75 |
| Injection Time | 10 sec. |

| -continued | |
| --- | --- |
| Mold Time | 20 sec. |
| Total Cycle Time | 30 sec. |
| Mold Temperature | 100° F. |
| 36 oz., 350 Ton Machine | |
| Barrel Temperature | 480°-490° F. |
| Measured Melt Temperature | 420° F. |
| Screw RPM | 80 |
| Total Cycle Time | 94 sec. |
| Mold Temperatures | 175° F. |
| Mold Time | 40 sec. |
| Injection Pressure | 1100 psi |

Mechanical properties of the test specimens prepared as described above were found to be as set forth in Table I below:

TABLE I
PBT Molding Compositions

| | Composition No. | | | |
| --- | --- | --- | --- | --- |
| | 1 | 2 | 3 | 4 |
| Ingredients | | | | |
| PBT (0.8 I.V.) | 90 | 70 | 70 | 60 |
| Glass Fibers-3/16 in. | 10 | 30 | — | 10 |
| Novaculite-3.65 avg. particle size (Malvern Mineral Co. L-207A) | — | — | 30 | 30 |
| Properties of Molded Samples | | | | |
| % Warp Annealed 357° F., 1 hr. | 357 | 457 | 210 | 164 |
| % Warp Unannealed | 305 | — | 111 | 130 |
| Unnotched Izod Impact-ft. lbs/in | 3.73 | 9.7 | 6.7 | 5.4 |
| Notched Izod Impact-ft. lbs/in. | 1.05 | 1.78 | .92 | .72 |
| Heat Distortion Temperature 265 psi, °C. | 200 | 210 | 55 | 200 |

While the invention has been described above with respect to certain preferred embodiments, it will be understood that various changes and modifications can be made without departing from the spirit or scope of the invention.

We claim:

1. Injection molding composition comprising at least about 30 wt% PBT having an intrinsic viscosity between about 0.5 and about 2.0 dl/g and containing:
   a. between about 0.5 and about 50 wt% based on total molding composition of thermally stable reinforcing fibers having diameters between about 5 and about 20 microns and aspect ratios of at least about 5, and
   b. between about 5 and about 70 wt% based on total molding composition of novaculite having an average particle size between about 3 and about 5 microns, with at least 90% of such novaculite particles having a maximum particle size less than about 10 microns.

2. Molding composition according to claim 1 which also contains between about 1 and about 25 wt% based on total molding composition of an amorphous, thermally stable resin.

3. Molding composition according to claim 2 in which the reinforcing fibers are glass fibers.

4. Molding composition according to claim 3 in which the fibers have diameters between about 10 and about 15 microns and aspect ratios of at least about 20.

5. Molding composition of claim 1 which also contains between about 5 and 40 wt% based on total molding composition of poly(butylene terephthalate-co-tetramethylene oxide) having a Shore D hardness between about 50 and about 60 and a melt index between about 7 and about 9.

6. Molding composition according to claim 3 wherein the amorphous, thermally stable resin is polymethyl methacrylate.

7. Molding composition according to claim 2 wherein the reinforcing fibers are glass fibers having diameters between about 10 and about 15 microns and aspect ratios of at least about 20 and the amorphous, thermally stable resin is polymethyl methacrylate having a melt index between about 1 and about 25.

8. A molded article of the molding composition of claim 1.

9. A molded article of the molding composition of claim 2.

10. A molded article of the molding composition of claim 3.

11. A molded article of the molding composition of claim 4.

12. A molded article of the molding composition of claim 5.

13. A molded article of the molding composition of claim 6.

14. A method for producing improved molding composition comprising intimately blending PBT having an intrinsic viscosity between about 0.5 and about 2.0 deciliters per gram with;
   a. between about 0.5 and about 50 wt% based on total weight of PBT molding composition of thermally stable reinforcing fibers having diameters between about 5 and about 20 microns and aspect ratios of at least about 5; and
   b. between about 5 and about 70 wt% based on total molding composition of novaculite having an average particle size between about 3 and about 5 microns, with at least 90% of such novaculite particles having a maximum particle size less than about 10 microns.

15. Method according to claim 14 wherein between about 1 and about 25 wt% based on total weight of PBT molding composition of an amorphous, thermally stable resin is also intimately blended into the composition.

16. Method according to claim 14 wherein the reinforcing fibers are glass fibers.

17. Method according to claim 16 wherein the fibers have diameters between about 10 and about 15 microns and aspect ratios of at least about 20.

18. Method according to claim 15 wherein the amorphous, thermally stable resin is polymethyl methacrylate.

19. Method according to claim 14 wherein the reinforcing fibers are glass fibers having diameters between about 10 and about 15 microns and aspect ratios of at least about 20, and the amorphous, thermally stable resin is polymethyl methacrylate having a melt index between about 1 and about 25.

20. Molding composition according to claim 1 which further contains flame retardant additives in amounts up to 30 wt% of the total molding composition.

* * * * *